(12) United States Patent
Kothari et al.

(10) Patent No.: US 7,730,495 B2
(45) Date of Patent: Jun. 1, 2010

(54) DECLARATIVELY DEFINED CONTROL ACTIONS

(75) Inventors: Nikhil Kothari, Sammamish, WA (US); Andres M. Sanabria, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 11/333,870

(22) Filed: Jan. 17, 2006

(65) Prior Publication Data
US 2007/0061741 A1    Mar. 15, 2007

Related U.S. Application Data

(60) Provisional application No. 60/716,562, filed on Sep. 12, 2005.

(51) Int. Cl.
G06F 1/04      (2006.01)
G06F 3/048     (2006.01)

(52) U.S. Cl. .................. 719/318; 713/502; 715/762

(58) Field of Classification Search .............. 714/45; 709/224; 345/744, 763; 717/106; 719/319
See application file for complete search history.

(56) References Cited

U.S. PATENT DOCUMENTS

| | | | |
|---|---|---|---|
| 6,014,666 A | | 1/2000 | Helland et al. |
| 6,083,276 A | | 7/2000 | Davidson et al. |
| 6,160,549 A | | 12/2000 | Touma et al. |
| 6,449,659 B1 * | | 9/2002 | Caron et al. ............. 719/315 |
| 6,493,837 B1 * | | 12/2002 | Pang et al. ............. 714/45 |
| 6,677,962 B1 * | | 1/2004 | Bailey ............. 715/744 |
| 6,715,107 B2 | | 3/2004 | Beer et al. |
| 6,856,322 B1 | | 2/2005 | Marrin et al. |
| 7,516,440 B2 * | | 4/2009 | Upton ............. 717/106 |
| 2002/0104071 A1 | | 8/2002 | Charisius et al. |
| 2003/0065807 A1 * | | 4/2003 | Satomi et al. ............. 709/231 |
| 2003/0226111 A1 | | 12/2003 | Wirts et al. |

(Continued)

FOREIGN PATENT DOCUMENTS

WO    WO 00/54202    9/2000

(Continued)

OTHER PUBLICATIONS

Peurta et al.; MOBI-D: A Model-Based Development Environment for User-Centered Design; 1997; CHI 97 Electronic Publications; 5 pgs.

(Continued)

Primary Examiner—Van H Nguyen
Assistant Examiner—Tuan Dao
(74) Attorney, Agent, or Firm—Merehant & Gould; Ryan T. Grace

(57) ABSTRACT

An extensible control design framework is utilized to declaratively define a control (both visual and non-visual) and other components. The functionality of a control may be expanded by declaratively adding behaviors and semantics via an object called an action. The control does not become unduly complex by the addition of the behaviors and semantics. The action object encapsulates well-defined functionality and is associated with an existing control. The action object is also associated with an event or trigger such that the functionality is automatically executed when the event is raised. The functionality may be packaged in an independent application component such that a user who is not familiar with programming code may easily define logic and functionality for an application in a design environment.

17 Claims, 8 Drawing Sheets

U.S. PATENT DOCUMENTS

| | | |
|---|---|---|
| 2004/0046789 A1 | 3/2004 | Inanoria |
| 2004/0196493 A1* | 10/2004 | Christiansen et al. ...... 358/1.15 |
| 2004/0233237 A1* | 11/2004 | Randow ..................... 345/763 |
| 2005/0055692 A1 | 3/2005 | Lupini et al. |
| 2005/0144174 A1 | 6/2005 | Pesenson et al. |
| 2005/0174587 A1* | 8/2005 | Hara .......................... 358/1.9 |
| 2005/0210263 A1* | 9/2005 | Levas et al. ................. 713/182 |

FOREIGN PATENT DOCUMENTS

WO     WO 2004/107164 A2     12/2004

OTHER PUBLICATIONS

Schlungbaum; "Individual User Interfaces and Model-based User Interface Software Tools"; IUI 1997; pp. 229-232.

* cited by examiner

```
/// <summary>
/// Base class for all control actions.
/// Each action can specify if it needs to run before the actual event or after. For example
/// ValidationAction needs to be executed before the event is raised.
/// The return value is meaningful for actions that execute before the event is raised.
/// The action could return true to cancel subsequent raising of the event.
/// </summary>
public abstract class ControlAction { protected ControlAction(ControlActionSequence actionSequence);

public ControlActionSequence Sequence { get; } public abstract bool Execute(Control associatedControl, EventArgs e);
} public sealed class ControlActionCollection : CollectionBase { public ControlActionCollection(Control associatedControl);

// Collection Stuff public ControlAction this[string id] { get; } public bool ExecuteActions(ControlActionSequence sequence, EventArgs e);
} public enum ControlActionSequence {

BeforeEvent,
    AfterEvent
}

/// <summary>
/// Allows an action to participate in customizing the post-back behavior. Controls would
/// call into actions implementing this interface for those actions associated with post-back
/// related events.
/// For example, ValidationAction would implement this interface to turn on the validation
/// behavior of PostBackOptions.
/// </summary>
public interface IPostBackCustomizer { void CustomizePostBack(PostBackOptions postBackOptions);
}
```

*Fig. 7*

```
public class Button : WebControl { public ControlActionCollection ClickActions {
        get {
            // ...
        }
    } protected virtual PostBackOptions GetPostBackOptions() {
        PostBackOptions options = new PostBackOptions(...);

// Any logic needed to setup the options foreach (ControlAction action in _clickActions) {
            IPostBackCustomizer postBackCustomizer = action as IPostBackCustomizer;
            if (postBackCustomizer != null) {
                postBackCustomizer.CustomizePostBack(options);
            }
        } return options;
    } protected virtual void OnClick(EventArgs e) {
        _clickActions.ExecuteActions(this, ControlActionSequence.BeforeEvent, e);

// Raise event

_clickActions.ExecuteActions(this, ControlActionSequence.AfterEvent, e);

// Raise bubbled event
    }
} public class ListControl : WebControl { public ControlActionCollection SelectionChangedActions { get; }
} public class TextBox : WebControl { public ControlActionCollection TextChangedActions { get; }
}
```

*Fig. 8*

DECLARATIVELY DEFINED CONTROL ACTIONS

RELATED APPLICATIONS

This utility patent application claims the benefit under 35 United States Code §119(e) of U.S. Provisional Patent Application No. 60/716,562 filed on Sep. 12, 2005, which is hereby incorporated by reference in its entirety.

BACKGROUND

Computer software applications are increasingly being developed in a declarative manner to simplify the development process. In user interface and application development frameworks, logic and non-user interface behavior is built into user interface components to expand control properties associated with the user interface components. Non-user interface behavior may be built into compositions of user interface components. Composite controls may be quite large with many different properties that are difficult for users to modify to accommodate different needs. The large number of properties complicates customization of the control because the user may not be familiar with all of the associated properties. The object model becomes bloated such that when the control is included in a form, users may be overwhelmed by the functionality offered by the control.

SUMMARY

An extensible control design framework is utilized to declaratively define a control (both visual and non-visual) and other components. The functionality of a control may be expanded by declaratively adding behaviors and semantics via an object called an action. The control does not become unduly complex by the addition of the behaviors and semantics. The action object encapsulates well-defined functionality and is associated with an existing control. The action object is also associated with an event or some other trigger such that the functionality is automatically executed when the event is raised. The functionality may be packaged in an independent application component such that a user who is not familiar with programming code may easily define logic and functionality for an application in a design environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is example code showing how the control design framework is implemented in a control designer.

FIG. 8 is example code showing how a basic control can provide functionality for declaratively defining control actions.

DETAILED DESCRIPTION

Figure 1:
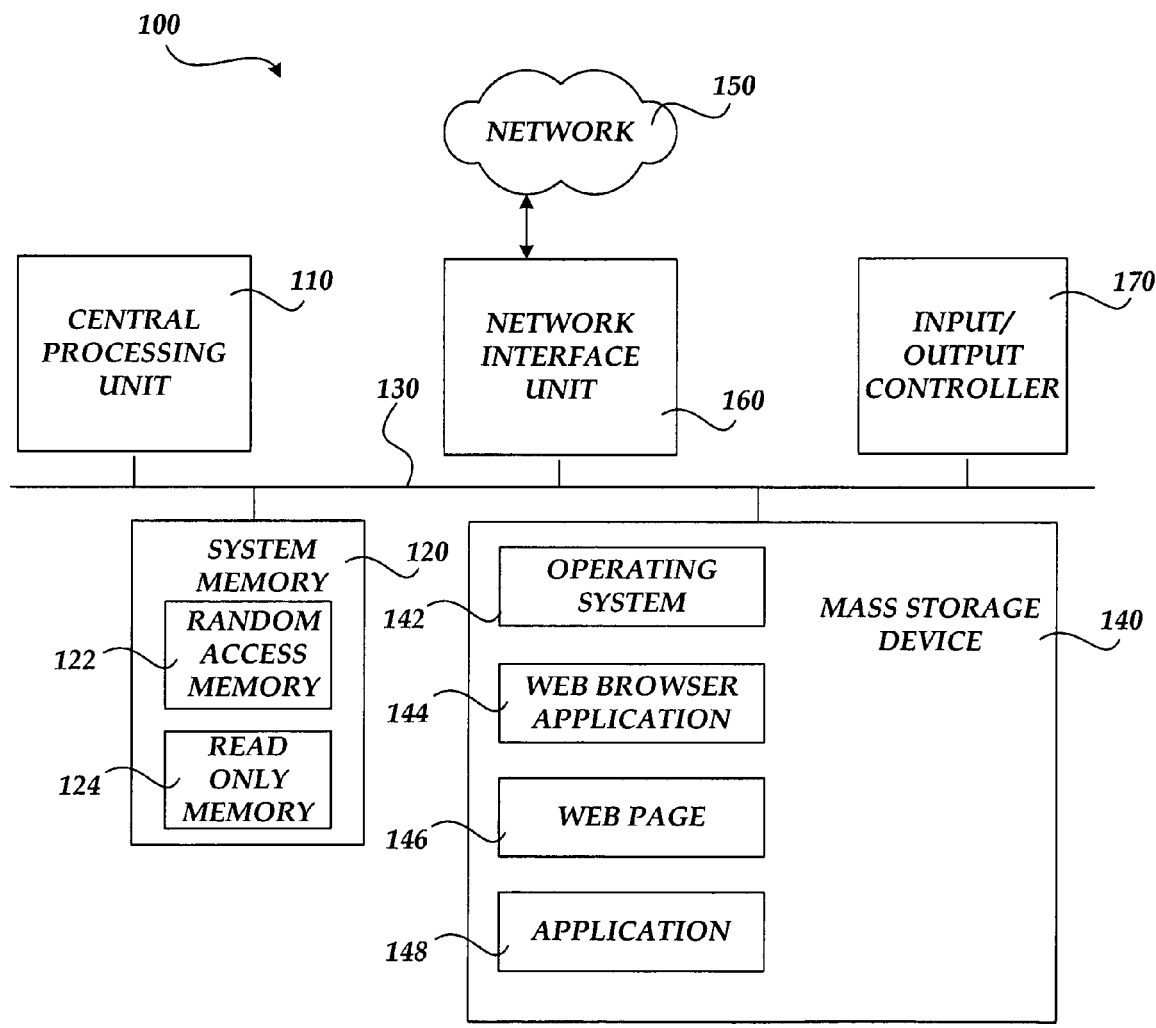
FIG. 1 is a computer system architecture diagram illustrating a computer system utilized in and provided by the various embodiments of the invention.

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Illustrative Operating Environment

Referring now to FIG. 1, an illustrative computer architecture for a computer 100 utilized in the various embodiments of the invention will be described. The computer architecture shown in FIG. 1 illustrates a conventional desktop or laptop computer, including a central processing unit 110 ("CPU"), a system memory 120, including a random access memory ("RAM") 122 and a read-only memory ("ROM") 124, and a system bus 130 that couples the memory to the CPU 110. A basic input/output system containing the basic routines that help to transfer information between elements within the computer, such as during startup, is stored in the ROM 124. The computer 100 further includes a mass storage device 140 for storing an operating system 142, application programs, and other program modules, which will be described in greater detail below.

The mass storage device 140 is connected to the CPU 110 through a mass storage controller (not shown) connected to the bus 130. The mass storage device 140 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments of the invention, the computer 100 may operate in a networked environment using logical connections to remote computers through a network 150, such as the Internet. The computer 100 may connect to the network 150 through a network interface unit 160 connected to the bus 130. The network interface unit 160 may also be utilized to connect to other types of networks and remote computer systems. The computer 100 may also include an input/output controller 170 for receiving and processing input from a number of other devices, including a keyboard, mouse, or electronic stylus (not shown in FIG. 1). Similarly, the input/output controller 170 may provide output to a display screen, a printer, or other type of output device.

As mentioned briefly above, a number of program modules and data files may be stored in the mass storage device 140 and RAM 122 of the computer 100, including an application 148 and the operating system 142 that is suitable for controlling the operation of a networked personal computer, such as the WINDOWS XP operating system from MICROSOFT CORPORATION of Redmond, Wash. The mass storage device 140 and the RAM 122 may also store one or more program modules. In particular, the mass storage device 140 and the RAM 122 may store a web browser application program 144. The web browser application program 144 is operative to request, receive, render, and provide interactivity with electronic documents, such as a web page 146 that has been formatted using HTML. According to one embodiment of the invention, the web browser application program 144 comprises the INTERNET EXPLORER web browser application program from MICROSOFT CORPORATION. It should be appreciated, however, that other web browser application programs from other manufacturers may be utilized to embody the various aspects of the present invention, such as the FIREFOX web browser application from the MOZILLA FOUNDATION.

Declaratively Defined Control Actions

An extensible control design framework is utilized to declaratively define a control (both visual and non-visual) and other components. The functionality of a control may be expanded by declaratively adding behaviors and semantics via an object called an action. The control does not become unduly complex by the addition of the behaviors and semantics. The action object encapsulates well-defined functionality and is associated with an existing control. The action object is also associated with an event or some other trigger such that the functionality is automatically executed when the event is raised. The functionality may be packaged in an independent application component such that a user who is not familiar with programming code may easily define logic and functionality for an application in a design environment.

The framework simplifies rapid application development (RAD). A designer may select and position application components using a visual design surface. The application components may be connected using the visual design surface. The application components may also be customized with properties by writing code for handling events and performing operations related to the event. The application components may be automatically invoked when the event is raised. The framework is applicable to other design environments including web design, script-based programming, form-based programming, and the like.

The control design framework is explained with reference to a click event associated with a button control. It should be appreciated that although the embodiments described herein are presented in the context of a click event associated with a button control, any event or trigger defined on control interfaces may be utilized.

Figure 2:
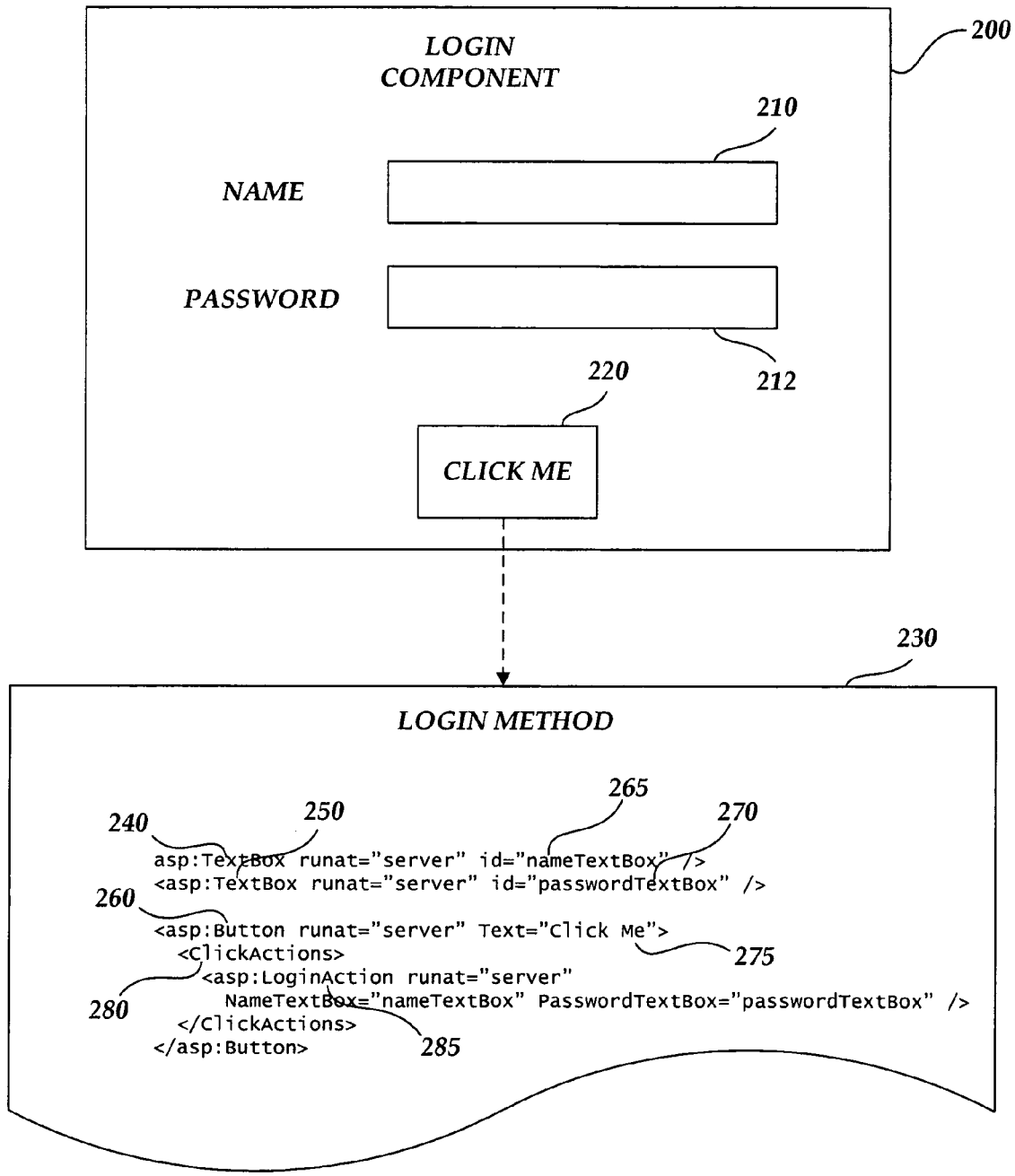
FIG. 2 is an example application component that implements declaratively defined controls.

The control design framework packages control functionality into components. The components are associated using declarative actions and behaviors. FIG. 2 illustrates an example component that implements declaratively defined controls. A developer may create a login component 200 as a composite control on a form with individual textbox controls 210, 212 and a button control 220. Each control within login component 200 is an independent entity that is singularly accessible on the form such that the controls may be customized and repositioned. A user may enter values in textboxes 210, 212 and click the button control 220. The click event raised at the button control 220 is associated with a login method 230.

The login method 230 includes example code for declaratively defining controls. The login method 230 pulls values from textbox controls 210, 212 when the click event associated with the button control 220 is raised. The login method 230 performs logic on the values and the user interface is updated in accordance with the result of the login logic operation (e.g., login is granted or denied).

The control design framework allows different application scenarios to be declaratively defined without creating custom controls for each specific scenario. Referring to the example code in the login method 230, a login scenario is implemented without a login control. The login component 200 is defined with controls such as two textboxes 240, 250 and a button 260. The textboxes 240, 250 and the button 260 may be independently customized and repositioned because the controls are not limited to a particular form structure. Each textbox 240, 250 has an associated text property 265, 270 (e.g., name, password), and the button 260 is also associated with a text property 275 (e.g., Click Me).

The button 260 is associated with ClickActions 280. ClickActions 280 includes LoginAction 285. LoginAction 285 is a login component that can be customized (e.g., name and password). LoginAction 285 is automatically triggered when the click event is raised because the LoginAction 285 is included in the ClickActions 280. The declaratively defined login component 200 has the same functionality as a login control defined by written code. The declaratively defined control benefits from the added flexibility of programming using building block controls on a visual design surface. A developer may further customize the controls on the visual design surface if necessary.

Figure 3:
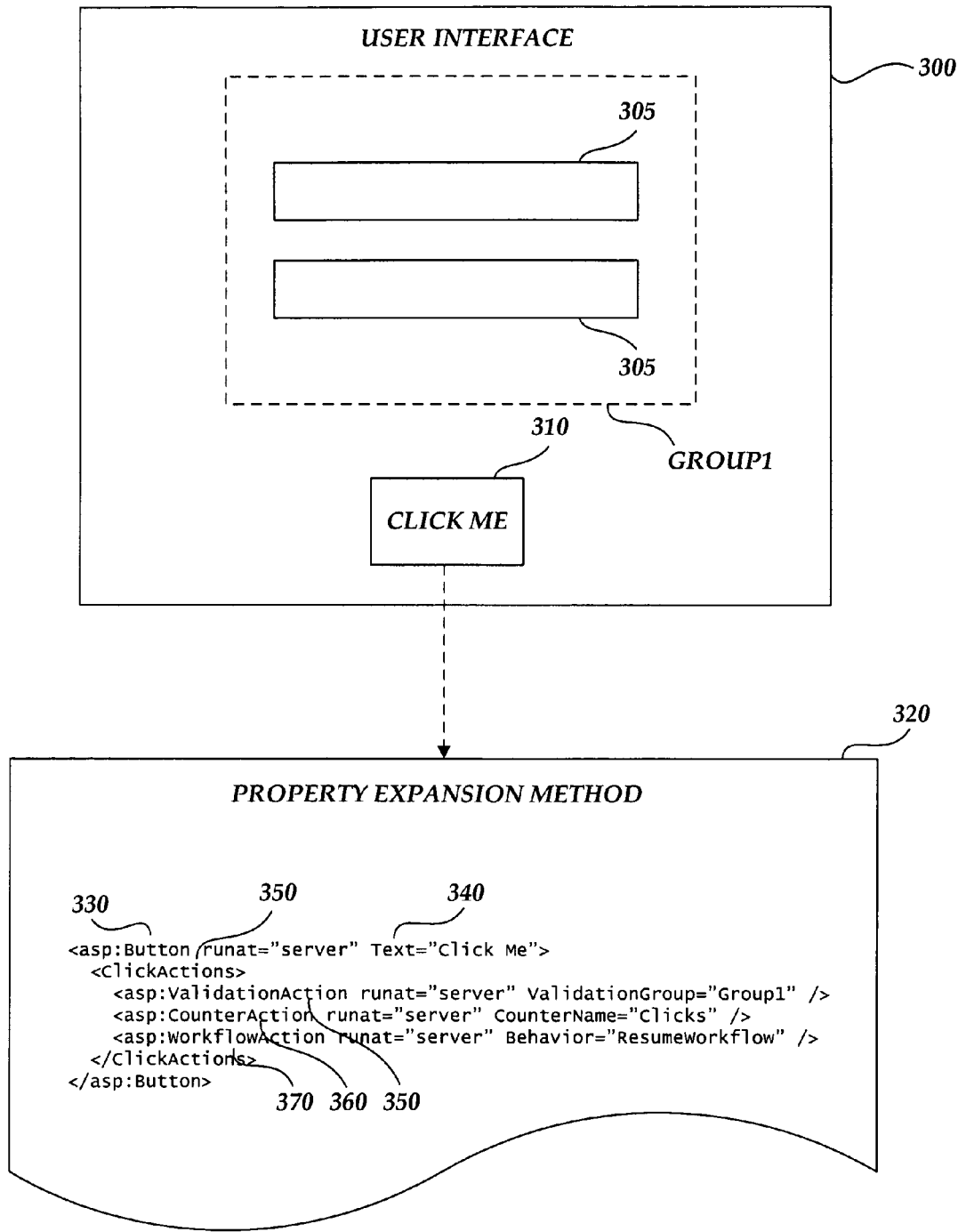
FIG. 3 is an example application component that implements declaratively defined controls.

FIG. 3 illustrates how the control design framework attaches additional behavior to a control. The attaching of additional behavior is described with reference to a button 310 on a user interface 300. The user interface 300 may also include textboxes 305 for a user to enter data values. The textboxes 305 may be grouped (e.g., the textboxes 305 are grouped and named "Group1".) The button 310 is associated with a property expansion method 320.

The property expansion method 320 defines a simple button control 330 with a text property 340. A click event (e.g., ValidationAction 350, a CounterAction 360 and a WorkflowAction 370) is raised when the button 310 is clicked.

Application semantics may be attached to the button 310 in an extensible manner such that control properties may be easily changed. The control properties may trigger or invoke any application logic (imperative or declarative) as configured. For example, the ValidationAction 350, the CounterAction 360 and the WorkflowAction 370 may all be performed when the button 310 is clicked. The ValidationAction 350 validates the data values in the textboxes 305 identified as Group1 in the user interface 300 when the button 310 is clicked. The CounterAction 360 keeps a tally of the number of times that the button 310 is clicked. The WorkflowAction 370 starts or resumes execution of any logic (imperative or declarative) associated with an application (such as a workflow) when the button 310 is clicked. Thus, additional properties are declaratively attached to the button 310 without complicating an existing object model or requiring the creation of a new object model.

Figure 4:
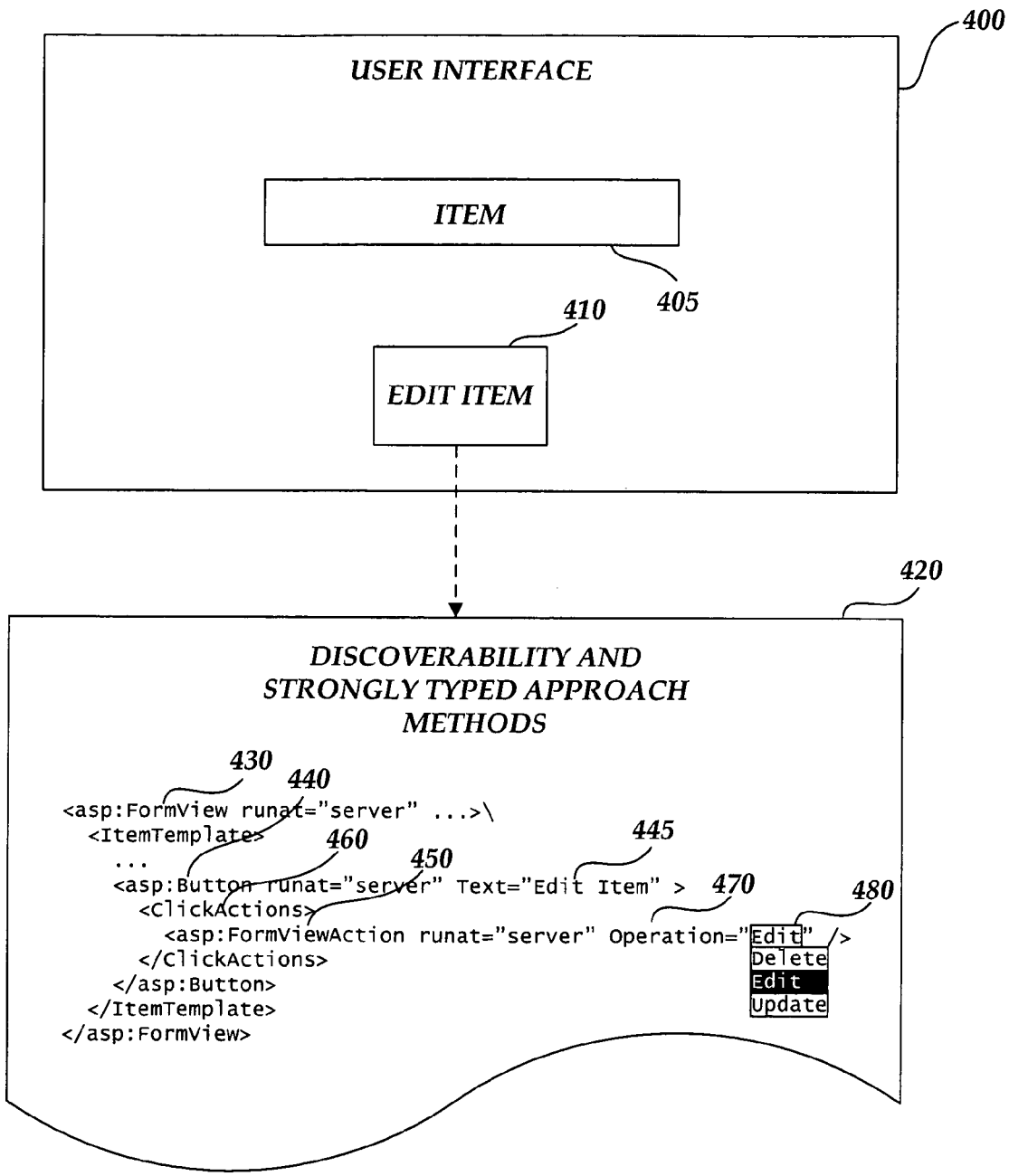
FIG. 4 is an example application component that implements declaratively defined controls.

FIG. 4 illustrates how the control design framework provides discoverability and a strongly typed approach to a control. A FormView control is associated with content from a database row. A button control associated with the FormView control performs database operations on the row. For example, an "Update" button may be associated with the FormView control as shown below:

<asp:Button CommandName="Update"/> where "Update" is a string property.

The FormView control specifically searches for a command name called "Update". The update logic is executed when the button is clicked. However, the update logic is not discoverable in current control frameworks. In other words, a developer that uses the FormView control in a program may be unaware of subcommands associated with the FormView control. In addition, it is not clear whether the command name is case sensitive. For example, the FormView control may specifically search for "Update" such that "update" may result in error and may be overlooked. Furthermore, a typographical error may cause the form to fail. For example, the update logic may not be performed when the button is clicked if "Update1" is searched rather than "Update". Known control programming frameworks require a user to scan the code to locate the typographical error.

The control design framework provides a strongly typed approach to programming controls. The term "strongly typed" refers to the explicit naming and typing of methods and member variables of a class. The type of data is known at compile time and as such, allows incorrect data type assignments to be resolved at compile time rather than at run time, saving processing and decreasing the chance of errors in the code. The control design framework also provides several built-in actions. As discussed above, third parties and application developers can develop new actions specific to particular scenarios. The actions should be discoverable in the control designer or other users unfamiliar with the newly defined actions would not know that they exist.

Discoverability and the strongly typed approach are described with reference to a button 410 on a user interface 400. The user interface 400 may also include a textbox 405 for a user to enter a data value such as "item". The button 410 is associated with a discoverability and strongly typed approach method 420. The discoverability and strongly typed approach method 420 defines a FormView control 430 and a simple button control 440 with a text property 445.

A developer does not need to know the specific set of strings used by the FormView control 430. Instead, the object model of an associated action provides that information. The button control 440 does not include a command name. The button control 440 includes a FormViewAction 450 inside the ClickActions 460 associated with the button 440. The FormViewAction 450 includes an Operation="Edit" property 470. The Operation="Edit" property 470 is an enumerated type (rather than a string) such that the property is associated with a fixed set of values (e.g., edit, delete, update, etc.). Enumerated types allow an editor and a parser to enforce a valid value for the enumeration. For example, a developer may type "Operation=". A drop down menu 480 may then be displayed with the different values of the enumeration such that the user may select a valid value. Thus, a developer can discover subcommands associated with a control.

The developer may enter a typographical error when typing the property 470. For example, the developer may have typed "Edit1" or "edit" rather than "Edit". When the page is parsed, "Edit1" results in a parser error because "Edit1" is an unknown value. "Edit" may also result in a parser error if the search function is case sensitive. The error would not result if the value were a string. Instead, a click event raised at the button 410 would result in no action. Thus, the enumerated type property is a strongly typed value that removes a class of errors caused by developer mistyping.

Figure 5:
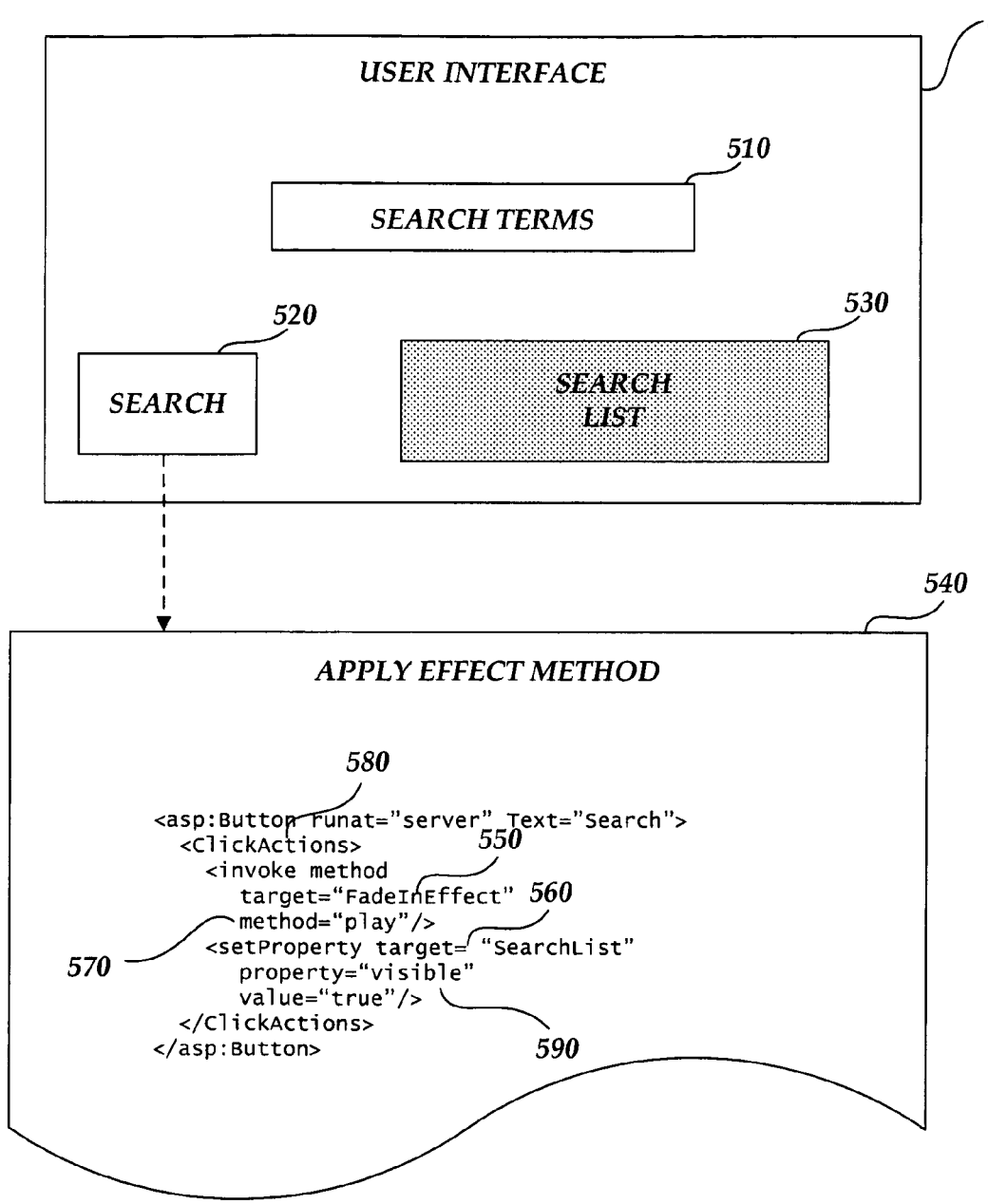
FIG. 5 is an example application component that implements declaratively defined controls.

FIG. 5 illustrates how the control design framework may be used to apply an effect to a control. A user interface 500 is arranged to receive input to perform a search. A text box 510 is arranged to receive search terms. The user may click a search button 520 to initiate the search. The results are displayed as a search list on a panel 530.

The search button 520 may be associated with an apply effect method 540 such that an effect may be applied to the search list when displayed on the panel 530. For example, a fade-in animation effect such as FadeInEffect 550 may be applied to a target object 560 such as the search list. The search list fades-in when displayed on the panel 530. The FadeInEffect 550 includes a play method 570 that is invoked by the click event 580. The click event 580 also attaches a property 590 to the panel 530 such that the panel 530 becomes visible. When the search button 520 is clicked, FadeInEffect 550 is applied to the panel 530 and the panel 530 becomes visible. Thus, a method may be declaratively defined by invoking the method and defining a particular target.

Figure 6:
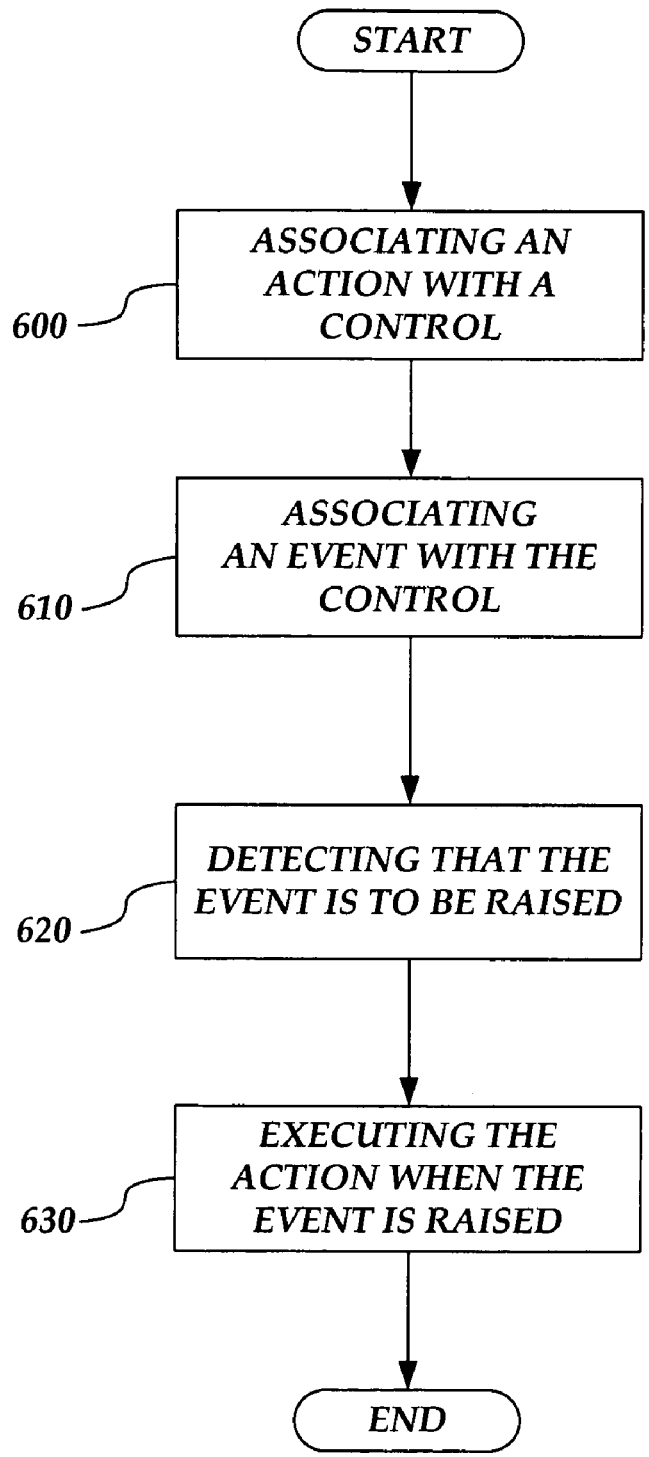
FIG. 6 is an operational flow diagram illustrating a process for declaratively defined control actions.

FIG. 6 is an operational flow diagram illustrating a process for declaratively defining control actions. The process begins at a start operation where a control is arranged to perform a function.

Processing continues at operation 600 where an action is associated with a control. For example, the control may be a button control, a textbox control or a form view control. The action encapsulates behaviors and semantics such that the functionality of the control is expanded. The action is an independent application component such that the control does not become unduly complex when the action is associated with the control. The independent application component allows the action to be defined as a building block in an application design environment. A developer may easily develop an application by assembling the building blocks to define logic and functionality for the application. In one embodiment, the action includes an enumerated property that identifies a fixed set of values. The fixed set of values may be displayed to a developer when the property is typed. If the developer mistypes a property value, an error results because the mistyped value is not included in the fixed set. In another embodiment, more than one control may be associated with an action. For example, one action may be nested within the other action. In yet another embodiment, additional properties may be associated with the control.

Proceeding to operation 610, an event is associated with the control. For example, if the control is a button, the associated event may be a click event raised at the button. Moving to operation 620, the control detects that the associated event is to be raised. In one embodiment, the control detects that the associated event is to be raised when a value is received at the control.

Transitioning to operation 630, the action is executed when the event is raised. The action may be executed by performing a logic operation on the value. Examples of executing the action include processing values, validating values, counting the number of times an event is raised, starting execution of a workflow, resuming execution of a workflow, discovering properties associated with a control, resolving incorrect data type assignments at compile time, applying an effect to a control, and the like.

Other independent actions associated with the event may also be executed. In one embodiment, the process is repeated to execute a sequence of actions. One action in the sequence may be executed and return a "false" value thereby interrupting the action sequence. Processing then terminates at an end operation.

FIG. 7 is an example code segment 700 showing how the control design framework is implemented in a control designer. The control designer can automatically offer an actions editor for controls that support actions via a task panel. The actions editor presents the set of actions available in the assemblies referenced by the application. The actions provide associated designer functionality to provide a rich editing experience beyond a property grid. Example code segment 700 indicates that an action may be executed before or after an event occurs.

A base class is provided for all control actions. Each action may specify whether the action executes before or after the event is raised. The return value is meaningful for actions that execute before the event is raised. The action could return "true" to cancel subsequent raising of the event. An action may be utilized in the customization of post-back behavior. Controls may call to actions implementing an interface for actions associated with post-back related events.

FIG. 8 is an example code segment 800 showing how a basic button control can provide functionality for declaratively defining control actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer-executable instructions for declaratively defining a control action, the instructions when executed by a processor performing the steps of:
    providing a visual design surface interface for defining a control;
    within the visual design surface interface, associating a first action component, of a plurality of predefined action components, with the control via a property expansion method defined in the control, wherein the first action component and the control are independent and customizable components;
    associating an event with the control to cause the property expansion method to execute when the event is received;
    receiving a value at the control;
    receiving an input on the control associated with the event to cause the property expansion method to execute and cause execution of the first action component, wherein executing the first action component comprises performing a logic operation on the value;
    associating a second action component with the first action component and the control via the property expansion method defined in the control, wherein the first action component, the second action component and the control are independent and customizable components, wherein the second action component is associated with enumerated type properties such that a selection of one of the enumerated type properties causes a valid property selection to be displayed with the second action component; and
    receiving the input on the control associated with the event to cause the property expansion method to execute and cause execution of the second action component.

2. The computer-readable storage medium of claim 1, wherein associating the second action component with the first action component and the control further comprises nesting the second action component within the first action component.

3. The computer-readable storage medium of claim 1, wherein executing the first action component further comprises associating logical semantics with the control, wherein the logical semantics are specific to an application associated with the control.

4. The computer-readable storage medium of claim 1, wherein execution of the first action component causes at least one member of a group comprising: displaying a text effect within the control, validating the received value, resolving any incorrect data assignments associated with the received value, and discovering a property associated with the control.

5. The computer-readable storage medium of claim 1, wherein the control is a button within the visual design surface interface.

6. The computer-readable storage medium of claim 1, wherein execution of the first and second action components includes execution of first and second actions on a defined target within the control.

7. A computer-implemented method for declaratively defining a control action, the method comprising:
    providing a visual design surface interface for defining a control;
    within the visual design surface interface, associating a first action component, of a plurality of predefined action components, with the control via a property expansion method defined in the control, wherein the first action component and the control are independent and customizable components;
    associating an event with the control to cause the property expansion method to execute when the event is received;
    receiving a value at the control;
    receiving an input on the control associated with the event to cause the property expansion method to execute and cause a processor to execute the first action component, wherein executing the first action component comprises performing a logic operation on the value;

associating a second action component with the first action component and the control via the property expansion method defined in the control, wherein the first action component, the second action component and the control are independent and customizable components, wherein the second action component is associated with enumerated type properties such that a selection of one of the enumerated type properties causes a valid property selection to be displayed with the second action component; and receiving the input on the control associated with the event to cause the property expansion method to execute and cause a processor to execute the second action component.

8. The computer-implemented method of claim 7, wherein associating the second action component with the first action component and the control further comprises nesting the second action component within the first action component.

9. The computer-implemented method of claim 7, wherein executing the first action component further comprises associating logical semantics with the control, wherein the logical semantics are specific to an application associated with the control.

10. The computer-implemented method of claim 7, wherein execution of the first action component causes at least one member of a group comprising: displaying a text effect within the control, validating the received value, resolving any incorrect data assignments associated with the received value, and discovering a property associated with the control.

11. The computer-implemented method of claim 7, wherein the control is a button within the visual design surface interface.

12. The computer-implemented method of claim 7, wherein execution of the first and second action components includes execution of first and second actions on a defined target within the control.

13. A system for declaratively defining a control action, the system comprising:

a processor; and a memory having computer executable instructions stored thereon, wherein the computer executable instructions are configured for:

providing a visual design surface interface for defining a control;

within the visual design surface interface, associating a first action component, of a plurality of predefined action components with the control via a property expansion method defined in the control, wherein the first action component and the control are independent and customizable components;

associating an event with the control to cause the property expansion method to execute when the event is received;

receiving a value at the control;

receiving an input on the control associated with the event to cause the property expansion method to execute and cause the processor to execute the first action component, wherein executing the first action component comprises performing a logic operation on the value;

associating a second action component with the first action component and the control via the property expansion method defined in the control, wherein the first action component, the second action component and the control are independent and customizable components, wherein the second action component is associated with enumerated type properties such that a selection of one of the enumerated type properties causes a valid property selection to be displayed with the second action component; and receiving the input on the control associated with the event to cause the property expansion method to execute and cause the processor to execute the second action component.

14. The system of claim 13, wherein associating the second action component with the first action component and the control further comprises nesting the second action component within the first action component.

15. The system of claim 13, wherein executing the first action component further comprises associating logical semantics with the control, wherein the logical semantics are specific to an application associated with the control.

16. The system of claim 13, wherein execution of the first action component causes at least one member of a group comprising: displaying a text effect within the control, validating the received value, resolving any incorrect data assignments associated with the received value, and discovering a property associated with the control.

17. The system of claim 13, wherein execution of the first and second action components includes a execution of first and second actions on a defined target within the control.

* * * * *